Feb. 20, 1951 S. L. FULLER 2,542,242
VEHICLE TURN-SIGNALING SWITCH
Filed April 6, 1949
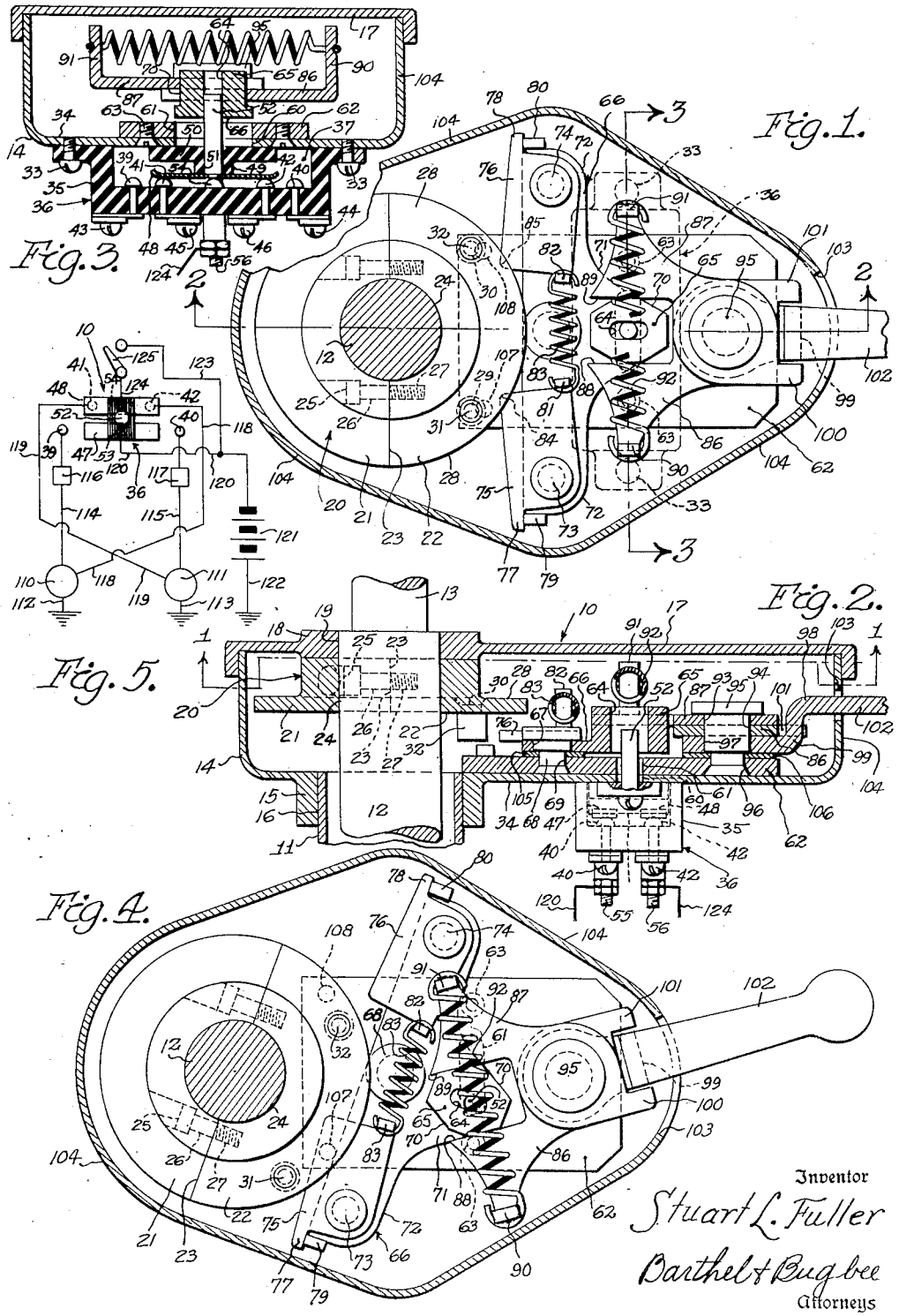
Inventor
Stuart L. Fuller
Barthel & Bugbee
Attorneys Patented Feb. 20, 1951

2,542,242

UNITED STATES PATENT OFFICE 2,542,242

VEHICLE TURN-SIGNALING SWITCH

Stuart L. Fuller, Royal Oak, Mich.

Application April 6, 1949, Serial No. 85,853

10 Claims. (Cl. 200—59)

This invention relates to motor vehicle turn direction indicators and, in particular, to control switches for such indicators.

One object of this invention is to provide a control switch for a motor vehicle turn direction indicator which will yieldably hold the switch arm in its shifted position to indicate a right or left-hand turn, but which instantly shifts the switch blade back to its neutral position on reverse rotation of the steering wheel to bring the vehicle back into a straight line path.

Another object is to provide a control switch for a motor vehicle turn direction indicator of the foregoing character which has a minimum number of moving parts consistent with efficient operation and dependability of the switch.

Another object is to provide a control switch for a motor vehicle turn direction indicator of the foregoing character wherein a manual switch-operating member is yieldably held against an abutment of novel shape so as to give a large positive abutment surface in either the neutral or right-hand or left-hand turn position, and thereby prevent the switch from becoming accidentally jolted out of position as well as to reduce noise and wear to a minimum.

Another object is to provide a motor vehicle turn signalling circuit using a control switch of the foregoing character wherein the signalling indication is given by intermittently flashing the tail light on the side toward which the turn is to be made, the opposite tail light being steadily illuminated at night and unilluminated by day.

In the drawings:

Figure 1 is a top plan view of a vehicle turn indicator switch in its neutral position, according to one form of the invention, with the cover removed and the casing and steering shaft in section along the line 1—1 in Figure 2;

Figure 2 is a central vertical section through the vehicle turn indicator switch of Figure 1, along the line 2—2 therein;

Figure 3 is a vertical cross-section along the line 3—3 in Figure 1;

Figure 4 is a view similar to Figure 1, but with the switch mechanism shifted into a left turn indicating position; and Figure 5 is a diagrammatic view of an electrical wiring circuit suitable for use with the control switch of the present invention.

Referring to the drawings in detail, Figures 1 and 2 show a vehicle turn indicator switch, generally designated 10, mounted on the tubular steering post 11 containing the usual steering wheel shaft 12, to the reduced diameter portion 13 of which a conventional steering wheel (not shown) is connected. The switch 10 is provided with a casing 14 having a flange 15 bored as at 16 to receive the steering post 11 and is also provided with a flanged cover 17 fitting down over the upper edge of the casing 14. The cover 17 has a boss 18 bored as at 19 for the reception of the steering wheel shaft 12. Mounted on the steering wheel shaft 12 adjacent the boss 18 and within the casing 14 is a switch actuator, generally designated 20, in the form of a collar having halves 21 and 22 split along the line 23 and bored as at 24 to receive the steering wheel shaft 12. The halves 21 and 22 are secured to one another and likewise clamped firmly upon the steering wheel shaft 12 by clamping screws 25 inserted in holes 26 in the collar half 21 and threaded into threaded holes 27 in the collar half 22 (Figure 1). The switch actuator 20 is provided with a flange 28 which has circumferentially spaced flared holes 29 and 30 in which are mounted switch-actuating pins or projections 31 and 32 respectively. If desired, rollers may be mounted on the pins 31 and 32 to reduce friction, the pins 31 and 32 being shown without rollers for the sake of simplicity of showing. The pins 31 and 32 have reduced diameter portions secured in the holes 29 and 30 by upsetting the upper ends in the manner of rivets.

Secured as by the screws 33 to the bottom wall 34 of the casing 14 is the housing 35 of a switch unit, generally designated 36. The housing 35 is in the form of a hollow rectangular block of insulating material having a cavity or recess 37 of rectangular cross-section therein. Mounted in the bottom wall 38 of the housing 35 are spaced pairs of outer and inner switch contacts 39, 40, and 41, 42 respectively. These contacts are connected respectively to outer and inner pairs of binding screws 43, 44, 45 and 46 to which connections are made in the electrical circuit shown in Figure 5.

Bridging contact is made between the pairs of outer and inner contacts 39, 40 and 41, 42 by switch blades 47 and 48 mounted on the transverse ridge 49 of a slider 50 of insulating material having a width slightly less than the width of the cavity 37 (Figure 2) and slidable longitudinally therein (Figure 3). Continuous electrical connection is maintained with the switch blades 47 and 48 by their constant engagement with a pair of central contacts 53 and 54 which are in turn connected to binding posts 55 and 56 in the bottom of the switch casing 35. Extending upward through a bore 51 in the slider 50 is an operating pin 52 which is slidable to and fro in elongated matching slots 60 and 61 in the bottom 34 of the casing 14 and in an elongated base plate 62 secured thereto as by the screws 63.

The operating pin 52 loosely engages an elongated slot 64 in the enlarged upstanding head or abutment element 65 of a T-shaped switch-resetting lever 66 which is bored as at 67 to receive a pivot pin 68 mounted in the bore 69 of the base plate 62 (Figure 2). The abutment head 65 is of polygonal shape having abutment sides 70, the opposite pairs of which are approximately parallel but of unequal length since the head 65 is elongated in the direction of the length of the lever 66, as viewed in Figure 2. The abutment head 65 is mounted on the end of the central arm 71 of the T-shaped lever 66, the cross arm 72 of which near its ends carries pivot pins 73 and 74 on which are pivotally mounted pawls 75 and 76 having arms 77 and 78 respectively engaging limit stops 79 and 80 struck up from the ends of the cross arm 72 of the T-shaped lever 66. The pawls 75 and 76 are of approximately rectangular shape and at their inner ends are provided with struck-up lugs 81 and 82 interconnected by a helical tension spring 83. The lugs 81 and 82 are located at the inner rearward corners of the rectangular pawls 75 and 76, the forward inner corners 84 and 85 of which are swung by the spring 83 into the paths of the pins 31 and 32 when the device is shifted into either of its signalling positions (Figure 4) out of the neutral position shown in Figure 1.

In order to shift the T-lever 66 into either of its signalling positions, the switch 10 is provided with a pair of swinging jaws 86 and 87 having contacts edges 88 and 89 adapted to engage opposite abutment sides 70 of the abutment head 65. The latter is shown in the form of an octagon but only three pairs of its sides serve as abutment surfaces. The hub of the jaw 86 is mounted beneath the hub of the jaw 87, the outer ends of the jaws 86 and 87 being bent upward in lugs 90 and 91. The lugs 90 and 91 are notched and interconnected by a tension spring 92 which urges the contact edges 88 and 89 into engagement with one pair of opposite sides 70 of the octagonal head 65, the opposite sides 70 of each pair being substantially parallel to one another.

The hubs of the jaws 86 and 87 are bored as at 93 and 94 respectively to receive a pivot pin 95 (Figure 2) mounted in a bore 96 in the base plate 62. Also pivotally mounted on the pivot pin 95 and bored as at 97 to receive it (Figure 2) is a bent hand lever 98, the bent portion 99 of which passes upward between lugs 100 and 101 projecting from the hubs of the jaws 86 and 87 (Figure 1). The lever 98 is provided with a handle portion 102 adapted to be grasped by the operator and projecting through an arcuate slot 103 in the side wall 104 of the casing 14. In order to insure smooth operation, washers 105 and 106 are mounted on the pivot pins 68 and 95 immediately above the base plate 62. In order to limit the rocking movement of the cross arm 72 of the T-lever 66, stop pins 107 and 108 are mounted in the forward end of the base plate 62 and project upwardly therefrom.

A typical wiring diagram for the vehicle turn indicator switch 10 of the present invention is shown in Figure 5. In this circuit, the vehicle is provided with a pair of tail lights 110 and 111 mounted on opposite sides of the car. The tail lights 110 and 111 on one side are grounded as at 112 and 113 to the vehicle frame and on their opposite sides are connected by wires 114 and 115 through flashers 116 and 117 to the switch contacts 39 and 40 respectively of the circuit breaker 36. The flashers 116 and 117 are conventional and may consist of the usual thermostatic switches which go on and off intermittently as the current causes the heat to rise within the flasher. Such flashers are well known in the electrical art and their details form no part of the present invention.

The tail lights 110 and 111 are also cross-connected to the circuit breaker contacts 41 and 42 by wires 118 and 119 running to the contacts 42 and 41 respectively by being connected to the binding screws 46 and 45 respectively (Figure 3). The central contact 53 of the switch blade 47 is connected by the wire 120 to the battery 21 which on its opposite side is grounded to the vehicle frame by the wire 122. The switch blades 47 and 48 are selectively connected to one another and disconnected from one another by bridging wires 123 and 124 running from the wire 120 and central contact 54 of the switch blade 48 to the opposite poles of the usual light switch 125 found on the dash or steering post of all motor vehicles. The connections shown in Figure 5 are made in the manner illustrated so that the tail lights 110 and 111 may be operated as flashing turn direction indicators by day or by night, but steadily illuminated during straightaway driving by night only. Under night driving conditions, of course, the light switch 125 is closed, whereas for daytime driving the light switch 125 is left open.

*Operation*

In the operation of the switch 10 for daytime driving, the parts normally occupy the neutral positions shown in Figures 1 and 2, and the vehicle light switch 125 is open, as shown in Figure 5. When it is desired to make a right-hand or left-hand turn of the vehicle, the handle portion 102 of the lever 98 is shifted in the direction in which the vehicle steering wheel would be rotated in order to execute such a turn. Let it be assumed that the operator of the vehicle is about to make a left-hand turn, whereupon he shifts the handle 102 to the right or counter-clockwise, that being the direction in which he will presently have to rotate the steering wheel in order to execute the turn.

When the operator shifts the handle 102 to the right (Figure 4), the sides of the bent portion 99 engage the lug 101 on the jaws 86 and 87, swinging these jaws around the pivot pin 95 into the positions shown in Figure 4. While the jaws 86 and 87 are thus swinging in a counter-clockwise direction, their contact edges 88 and 89 engage the octagonal head 65 to swing the T-lever 66 clockwise around its pivot pin 68, the jaws 86 and 87 swinging apart from one another around the pivot pin 95 as their contact edges 88 and 89 pass over the ridges or corners between one pair of the sides 70 of the octagonal head 65 to another pair thereof. As the jaws 86 and 87 separate, the spring 92 yields to permit them to do so.

The swinging of the T-lever 66 in a clockwise direction swings the cross arm 72 thereof to project the left-hand pivoted pawl 75 into the path of action of the pins 31 and 32. Figure 4 shows the positions of the parts just after the switch 10 has been shifted to indicate a left-hand turn of the vehicle, but before the operator has rotated the steering wheel to execute the turn. In this position, the clockwise swinging of the T-lever 66 (Figure 4) has shifted the operating pin 52 of the switch unit 36 to the left, causing the switch blades 47 and 48 of the switch unit 36 to shift to the left. For daytime driving, the shifting of the switch blade 48 produces no effect since the light switch 125 is open. The shifting of the switch blade 47, however, connects the battery 121 to the left-hand tail light 110 to the wire 120, the switch blade 47, the contact 39, and the wire 114 containing the flasher 116. This causes the left-hand tail light 110 to go off and on alternately in response to the action of the flasher 116, emitting flashing signals to indicate a left-hand turn while the tail light 111 remains dark. Until the operator actually makes the turn, however, the tail light 110 continues flashing.

When the operator rotates the steering wheel in a counterclockwise direction to execute the left-hand turn, the parts of the switch 10 being in the position shown in Figure 4, the pin 31 on the collar 20 swings past the pawl 75, pushing it inward or rearward without acting upon it in a positive manner and passes over the pawl or detent 75 without disturbing the relationship of the parts shown in Figure 4. The vehicle therefore turns to the left while the left tail light 110 is still flashing.

The operator then rotates to steering wheel in a clockwise direction to resume his straightaway travel down the left-hand road or street. As he does so, he swings the collar 20 and pins 31 and 32 in a clockwise direction. When this occurs, the pin engages the end of the pawl 75 instead of the side, and pushes it to the left since the pawl 75 can yield no further because its arm 77 is solidly up against the lug 79. This action, therefore causes the now unyielding pawl 75 to swing the T-lever 66 in a counterclockwise direction back into its neutral position shown in Figure 1, shifting the operating pin 52 and switch blades 47 and 48 of the slider 50 back into the neutral position shown in Figure 5. This disconnects the switch blade 47 from the contact 39 and de-energizes the tail light 110, the tail light 111 remaining de-energized.

To signal for a right-hand turn, the operator swings the handle 102 in the direction in which he would turn the steering wheel to execute the right hand turn, namely in a clockwise direction. The position of the parts would therefore be the reverse of those shown in Figure 4, but the action would be otherwise similar except that the pawl 76 now restores the switch to its neutral position instead of the pawl 75.

In operating the device at night, the light switch 125 is closed, bridging the switch blades 47 and 48 through the wires 120, 123 and 124. While the switch 10 is in its neutral position, therefore, the switch blade 48 bridges both of the contacts 41 and 42 and connects the cross wires 118 and 119 to the battery 121 through the wire 120. Thus, the tail lights 110 and 111 are energized directly without the current passing through the flashers 116 and 117, and the tail lights give a steady light. When the operator makes a turn, for example, a left-hand turn similar to that previously described in connection with daytime driving, the switch blades 47 and 48 are again shifted to the left (Figure 5). This action disconnects the contacts 41 and 42 from one another since the switch blade 48 moves off the contact 42, hence the left-hand tail light 110 is de-energized for steady or continuous illumination. At the same time, however, it is connected to the battery 121 in the manner previously described by way of the wire 114 containing the flasher 116, the contact 39, the switch blade 47, and the wire 120, so that the left-hand tail light 110 commences flashing intermittently in response to the action of the flasher 116. The operation is otherwise the same and a right-hand turn is executed in a manner similar to that described in connection with daytime driving, above.

While Figure 1 shows two switch actuator pins 31 and 32, it will be obvious that a single pin may also be used to actuate either of the two pawls 75. It will also be evident from Figure 5 that a single flasher may be inserted in the line 120 to replace the two separate flashers 116 and 117 in the lines 114 and 115.

What I claim is:

1. A manually-set vehicle turn-signalling switch which is automatically reset by a switch actuator on the vehicle steering shaft, comprising a support mounted adjacent said actuator, a switch-resetting member movably mounted on said support and having thereon a polygonal abutment with a plurality of pairs of opposed abutment surfaces, a pair of spaced pawls mounted on said switch-resetting member and movable therewith into and out of the path of said actuator, a manual switch-setting assembly movably mounted on said support and having spaced portions engageable with said abutment surfaces, a plurality of spaced turn-signalling contacts associated with said support, and a movable switch element operatively connected to said switch setting assembly and movable therewith selectively into engagement with said contacts.

2. A manually-set vehicle turn-signalling switch which is automatically reset by a switch actuator on the vehicle steering shaft, comprising a support mounted adjacent said actuator, a switch-resetting member movably mounted on said support and having thereon a polygonal abutment with a plurality of pairs of opposed abutment surfaces, a pair of spaced pawls mounted on said switch-resetting member and movable therewith into and out of the path of said actuator, said pawls being movably mounted on said switch-resetting member and yieldable in one direction of engagement by said actuator and unyieldable in the opposite direction of engagement by said actuator, a manual switch-setting assembly movably mounted on said support and having spaced portions engageable with said abutment surfaces, a plurality of spaced turn-signalling contacts associated with said support, and a movable switch element operatively connected to said switch-setting assembly and movable therewith selectively into engagement with said contacts.

3. A manually-set vehicle turn-signalling switch which is automatically reset by a switch actuator on the vehicle steering shaft, comprising a support mounted adjacent said actuator, a switch-resetting member movably mounted on said support and having thereon a polygonal abutment with a plurality of pairs of opposed abutment surfaces, a pair of spaced pawls mounted on said switch-resetting member and movable therewith into and out of the path of said actuator, said pawls being movably mounted on said switch-resetting member and yieldable in one direction of engagement by said actuator and unyieldable in the opposite direction of engagement by said actuator, said switch-resetting member having stops thereon limiting the motion of said pawls, a manual switch-setting assembly movably mounted on said support and having spaced portions engageable with said abutment surfaces, a plurality of spaced turn-signalling contacts associated with said support, and a movable switch element operatively connected to said switch-setting assembly and movable therewith selectively into engagement with said contacts.

4. A manually-set vehicle turn-signalling switch which is automatically reset by a switch actuator on the vehicle steering shaft, comprising a support mounted adjacent said actuator, a switch-resetting member movably mounted on said support and having thereon a polygonal abutment with a plurality of pairs of opposed abutment surfaces, a pair of spaced pawls mounted on said switch-resetting member and movable therewith into and out of the path of said actuator, a manual switch-setting assembly pivotally mounted on said support and having spaced portions engageable with said abutment surfaces, a plurality of spaced turn-signalling contacts associated with said support, and a movable switch element operatively connected to said switch-setting assembly and movable therewith selectively into engagement with said contacts.

5. A manually-set vehicle turn-signalling switch which is automatically reset by a switch actuator on the vehicle steering shaft, comprising a support mounted adjacent said actuator, a switch-resetting member pivotally mounted on said support and having thereon a polygonal abutment with a plurality of pairs of opposed abutment surfaces, a pair of spaced pawls mounted on said switch-resetting member and movable therewith into and out of the path of said actuator, a manual switch-setting assembly pivotally mounted on said support and having spaced portions engageable with said abutment surfaces, a plurality of spaced turn-signalling contacts associated with said support, and a movable switch element operatively connected to said switch-setting assembly and movable therewith selectively into engagement with said contacts.

6. A manually-set vehicle turn-signalling switch which is automatically reset by a switch actuator on the vehicle steering shaft, comprising a support mounted adjacent said actuator, a switch-resetting member movably mounted on said support and having thereon a polygonal abutment with a plurality of pairs of opposed abutment surfaces, a pair of spaced pawls mounted on said switch-resetting member and movable therewith into and out of the path of said actuator, a manual switch-setting assembly movably mounted on said support and having relatively movable jaws with spaced portions engageable with said abutment surfaces, a plurality of spaced turn-signalling contacts associated with said support, and a movable switch element operatively connected to said switch-setting assembly and movable therewith selectively into engagement with said contacts.

7. A manually-set vehicle turn-signalling switch which is automatically reset by a switch actuator on the vehicle steering shaft, comprising a support mounted adjacent said actuator, a switch-resetting member movably mounted on said support and having thereon a polygonal abutment with a plurality of pairs of opposed abutment surfaces, a pair of spaced pawls mounted on said switch-resetting member and movable therewith into and out of the path of said actuator, a manual switch-setting assembly movably mounted on said support and having yieldingly-urged relatively-movable jaws with spaced portions engageable with said abutment surfaces, a plurality of spaced turn-signalling contacts associated with said support, and a movable switch element operatively connected to said switch-setting assembly and movable therewith selectively into engagement with said contacts.

8. A manually-set vehicle turn-signalling switch which is automatically reset by a switch actuator on the vehicle steering shaft, comprising a support mounted adjacent said actuator, a switch-resetting member movably mounted on said support and having thereon a polygonal abutment with a plurality of pairs of opposed abutment surfaces, a pair of spaced pawls mounted on said switch-resetting member and movable therewith into and out of the path of said actuator, a manual switch-setting assembly movably mounted on said support and having spaced portions engageable with said abutment surfaces, a plurality of spaced turn-signalling contacts associated with said support, and a movable switch element having a sliding connection with said switch-setting assembly and movable therewith selectively into engagement with said contacts.

9. A manually-set vehicle turn-signalling switch which is automatically reset by a switch actuator on the vehicle steering shaft, comprising a support mounted adjacent said actuator, a switch-resetting member movably mounted on said support and having thereon a polygonal abutment with a plurality of pairs of opposed abutment surfaces disposed approximately in octagonal formation, a pair of spaced pawls mounted on said switch-resetting member and movable therewith into and out of the path of said actuator, a manual switch-setting assembly movably mounted on said support and having spaced portions engageable with said abutment surfaces, a plurality of spaced turn-signalling contacts associated with said support, and a movable switch element operatively connected to said switch-setting assembly and movable therewith selectively into engagement with said contacts.

10. A manually-set vehicle turn-signalling switch which is automatically reset by a switch actuator on the vehicle steering shaft, comprising a support mounted adjacent said actuator, a switch-resetting member pivotally mounted on said support and having thereon a polygonal abutment with a plurality of pairs of opposed abutment surfaces disposed approximately in octagonal formation, a pair of spaced pawls mounted on said switch-resetting member and movable therewith into and out of the path of said actuator, a manual switch-setting assembly pivotally mounted on said support and having spaced portions engageable with said abutment surfaces, a plurality of spaced turn-signalling contacts associated with said support, and a movable switch element operatively connected to said switch-setting assembly and movable therewith selectively into engagement with said contacts.

STUART L. FULLER.

REFERENCES CITED

The following references are of record in the file of this patent:

UNITED STATES PATENTS

| Number | Name | Date |
|---|---|---|
| 1,690,370 | Hoeller | Nov. 6, 1928 |
| 2,086,959 | Rom | July 13, 1937 |
| 2,090,101 | Bonham | Aug. 17, 1937 |
| 2,141,210 | Foulks | Dec. 27, 1938 |
| 2,230,994 | Arbuckle et al. | Feb. 11, 1941 |
| 2,267,743 | Murray, Jr. | Dec. 30, 1941 |
| 2,427,595 | Fuller | Sept. 16, 1947 |